B. FELDMAN.
DENTAL FORCEPS.
APPLICATION FILED SEPT. 7, 1912.

1,060,242.

Patented Apr. 29, 1913.

2 SHEETS—SHEET 1.

WITNESSES
Fenton S. Belt
J. H. Sherwood

INVENTOR
Bernard Feldman
By Franklin H. Hough
Attorney

B. FELDMAN.
DENTAL FORCEPS.
APPLICATION FILED SEPT. 7, 1912.
1,060,242.
Patented Apr. 29, 1913.
2 SHEETS—SHEET 2.
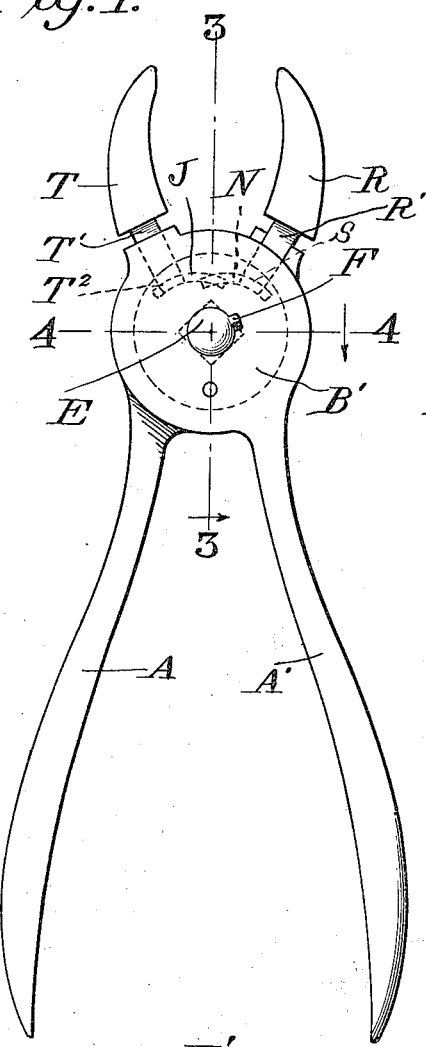
Fig. 1.
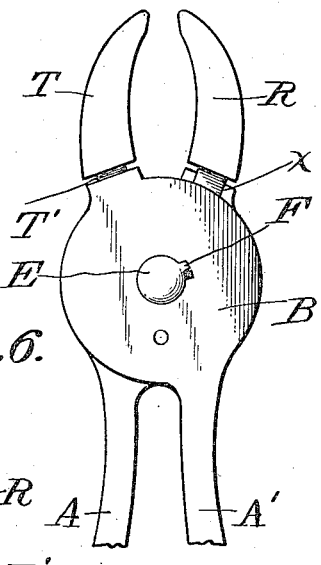
Fig. 5.
Fig. 6.
Fig. 7.
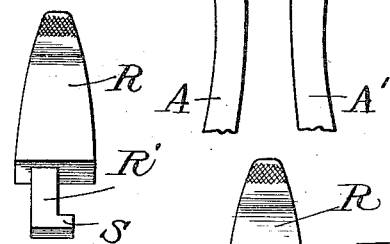
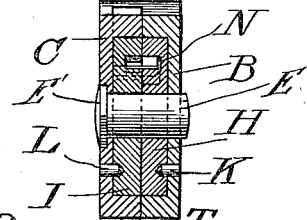
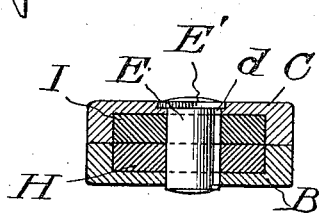
Fig. 8.
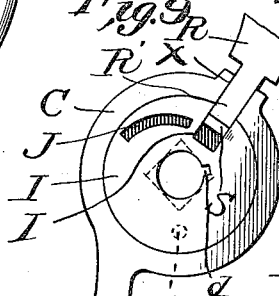
Fig. 9.
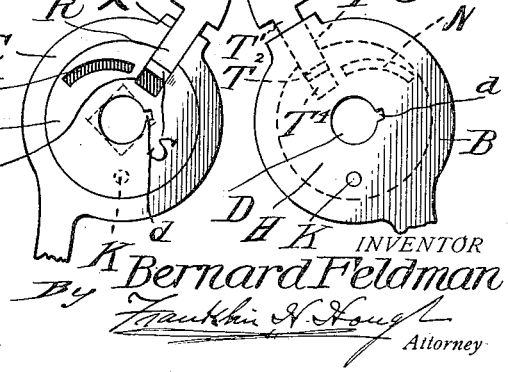
Fig. 10.
WITNESSES
Fenton S. Belt
J. W. Sherwood
INVENTOR
Bernard Feldman
By Franklin N. Hough
Attorney
COLUMBIA PLANOGRAPH CO., WASHINGTON, D. C.

UNITED STATES PATENT OFFICE.

BERNARD FELDMAN, OF PERTH AMBOY, NEW JERSEY.

DENTAL FORCEPS.

1,060,242.  Specification of Letters Patent.  Patented Apr. 29, 1913.

Application filed September 7, 1912. Serial No. 719,195.

*To all whom it may concern:*

Be it known that I, BERNARD FELDMAN, a citizen of the United States, residing at Perth Amboy, in the county of Middlesex and State of New Jersey, have invented certain new and useful Improvements in Dental Forceps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dental forceps adapted for use for the ready extraction of teeth from the human or animal mouth, and the object in view is to produce a device of this character whereby the pull or the jerk employed by the operator in the act of drawing the teeth may be eliminated.

In the extraction of teeth by my improved forceps the compression of the handles toward each other will have the tendency to cause the curved beaks to have a slight longitudinal movement causing the jaws thereof to grip the teeth securely and dislodge the tooth from its socket, thus materially aiding the extraction of the tooth.

More specifically, the present invention comprehends the employment of cam actuating means, so arranged that when the handles of the forceps, which are pivoted together are moved toward each other, the action of cams will be exerted to forcefully move the beaks in contact with the tooth and exert a pulling force thereon gradually dislodging the root of the tooth from the cavity of the jaw.

My invention is illustrated in the accompanying drawings, in which:—

Figure 1:
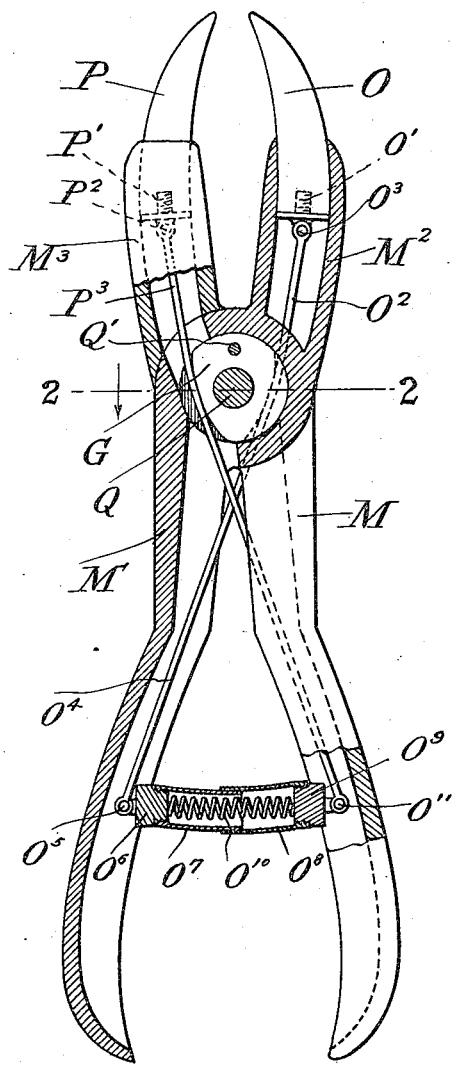
Figure 3:
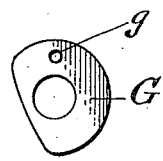
Figure 2:
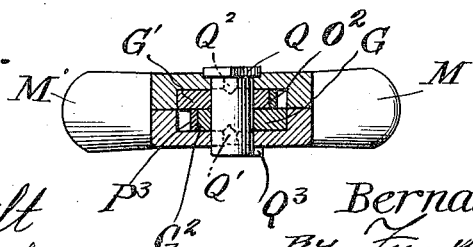

Figure 1 is a vertical sectional view of the forceps embodying my invention, portions of the invention being in a side elevation. Fig. 2 is a sectional view on line 2—2. Fig. 3 is a detailed view of a cam forming a part of the invention. Fig. 4 is a side elevation showing a slight modification of the invention. Fig. 5 is a view similar to Fig. 4, showing the beaks drawn toward each other. Fig. 6 is a detail view of one of the beaks. Fig. 7 is a sectional view on line 3—3 of Fig. 4. Fig. 8 is a sectional view on line 4—4 of Fig. 4. Fig. 9 is an inner face view of a portion of one of the handles and recessed cam carrying portion and cam therein. Fig. 10 is a detail view of the head of the other handle of the forceps.

Reference now being had to the details of the drawings by letter, M and M' designate two handles which are pivoted together by means of a pin Q having one end squared and adapted to engage a similar shaped recess in the outer face of one of the handles, while at its other end said pin is pivoted with a lug $Q^3$ which, when the pin is adjusted in place, is adapted to pass through a recess (not shown in Figs. 1 and 2 of the drawings) but in the manner shown in Fig. 5, and after the pin has been given a partial rotary movement said lug $Q^3$ will serve to hold the two handles fastened together. Each handle above its pivotal point is provided with a socket $M^2$, and in one of said sockets is mounted to have a slight longitudinal movement a beak O preferably curved as shown, and the wall of the socket in which the beak is mounted is curved to conform to the curvature of the beak therein. The other socket is provided with a similar beak P. The inner end of the beak is provided with a threaded hole for the reception of a screw O', having a head carrying a pin $O^3$ to which one end of the wire $O^2$ is pivotally connected. The beak P also has a similar screw P' fitted in the inner end thereof and a pin $P^2$ forms a means for pivotally connecting the latter with a wire $P^3$. Each of the shank portions of the handle about the pivotal portions thereof is recessed, as shown clearly in Fig. 2 of the drawings, and two disks G and G' each having a cam edge, are mounted one in each of said recesses with their inner adjacent faces in contact with each other. It will be noted that the two wires $O^2$ and $P^3$ engage each a cam edge of one of said disks. A pin Q' passes through the wall of the recessed portion of the handle M' and also through an aperture $g$ in the disk G and serves to hold the latter in place, while a pin $Q^2$, shown in Fig. 2 of the drawings, passes through the other handle and is adapted to engage and hold the disk G'. Corresponding ends of the wires $O^2$ and $P^3$ are fastened respectively to the pins $O^5$ and O" projecting respectively from the lugs $O^6$ and $O^9$. The lug $O^6$ is provided with a contracted threaded portion adapted to receive an open ended shell $O^7$, which telescopes within a similar shell O⁸, fitted to a threaded portion of the circumference of the plug O⁹. Said shells O⁷ and O⁸ telescope within each other and a coil spring O¹⁰ bears against the adjacent ends of said plugs and tends to normally hold the beaks and handles spaced apart.

Referring to Figs. 4 and 10 inclusive, it will be seen a modification of my invention in which letters A and A' designate two handles pivoted together by means of a pin E similar in construction to the pin Q before described and which pin is provided with a lug F and has a squared end E' engaging an angular outlined recess formed in the outer face of the head C which is integral with the handle 8. Said lug F is adapted when in registration with recesses formed in the heads C and B, to allow the pin E to be passed through the two handles to pivot the same together. Said heads are recessed for the reception of the disks I and H, the former of which is provided with a cam slot J, shown clearly in Fig. 9 of the drawings, and said disk I is provided with a slot I² for the reception of the contracted shank portion R' of the beak R, a detail view of said shank R being shown in Fig. 6 of the drawings and which is provided with a laterally extending portion S adapted for engagement with a cam slot N formed in the disk H, and shown in dotted lines in Fig. 10 of the drawings.

The two beaks T and R illustrated in Figs. 4 and 5 are identical in construction and each is mounted to have a sliding movement in a channel formed in the inner face of the head in which it is mounted. The beak T has a shank portion T' with an angled end T² and said shank portion T² moves in a groove formed in a channel T³ formed in the inner face of the head B and is movable in a slot T⁴ formed in the disk H. A retainer pin K passes through the wall of the head B and engages the disk H, as shown in Fig. 7 of the drawings while a similar pin L passes through the head C and engages the disk I.

In operation, referring to the form shown in Figs. 1 to 3 inclusive, when the two handles are compressed by the operator gripping the two in his hand, the disks each moving with its particular handle will cause the cam edges to fulcrum against the wires causing the beaks to be drawn slight distances into the sockets in which they are mounted, thus tending to draw the outer tooth engaging ends thereof in contact with the tooth to be extracted. As the handles approach each other the beaks will be exerting a pulling effect upon the tooth and the greater pressure applied to the handles the greater will be the gripping force upon the tooth to be extracted.

In the modified forms shown in Figs. 4 to 10 the movement of the beaks is similar to that before described and as illustrated in Fig. 1 excepting that the wires which are connected to the beaks, are dispensed with and the action of the beaks is affected through the medium of the angled inner ends of the shank portions thereof engaging the cam slots in the disks H and I and which will tend, as the handles are compressed by the hands of the operator, to cause the two beaks to be drawn into the channels and slots provided therefor in the heads of the handles and disks H and I, whereas when the handles are separated, a reverse outer longitudinal movement will be imparted to the beaks returning the same to normal open positions, as shown in Fig. 4 of the drawings.

From the foregoing it will be noted that by the provision of forceps made in accordance with my invention the beaks, when shoved into the gums and about the tooth, in order to obtain a firm gripping or hold upon the tooth to be extracted will, when the handles are brought under pressure toward each other, be forced to grip the tooth, and upon a further pressure being applied to the handle, an inner longitudinal movement will be imparted to each beak and which will be sufficient to dislodge the tooth from its socket, thus materially aiding in the extraction of the tooth and thereby eliminating the usual pull or jerk incident to extracting teeth by the ordinary forceps commonly used.

What I claim to be new is:

1. Dental forceps comprising two handles which are pivoted together, a beak movable upon each handle and actuating means for causing the beaks to move longitudinally by the bringing of the handles together, as set forth.

2. Dental forceps comprising two handles which are pivoted together, the end of each handle having a socket formed therein, a beak movable within each socket, and cam actuating means connected to each of said beaks and adapted, as the handles are forced toward each other to cause an inner longitudinal movement to be imparted to each beak, as set forth.

3. Dental forceps comprising two handles which are pivoted together, the end of each handle having a socket formed therein, a beak movable within each socket, wires fastened to the inner ends of the beak and to the handle in which the beak is mounted and cam disks mounted upon the handles and adapted as the latter are moved toward each other to cause an inner longitudinal movement to be imparted to said beaks, as set forth.

4. Dental forceps comprising two handles which are pivoted together, the end of each handle having a socket formed therein, a beak movable within each socket, wires fastened to the inner ends of the beaks and to the handles in which the beaks are mounted, each handle having a recess in the inner face thereof, a disk seated in the recess and having a cam edge against which one of said wires is adapted to fulcrum, and affording means whereby as the handles are moved toward each other an inner longitudinal movement will be imparted to the beaks, as set forth.

5. Dental forceps comprising two handles which are pivoted together, one end of each handle having a socket formed therein, a beak movable within each socket, the inner end of the beak having a threaded hole therein, a screw fitted in said hole, a wire pivoted to each screw and fastened to the handle carrying said beak, each handle having a recess in its inner face, a disk seated in each of said recesses and each disk provided with a cam edge against which one of said wires is adapted to fulcrum.

6. Dental forceps comprising two handles which are pivoted together, the end of each handle having a socket formed therein, walls of which are curved, a curved beak movable within each socket, open ended shells fastened one to the inner edge of each handle, a threaded plug fitted in each shell and to which said wires are pivotally connected, a spring bearing between said plugs, and disks carried one by each handle and having a cam edge against which said wires are adapted to fulcrum, as set forth.

In testimony whereof I hereunto affix my signature in the presence of two witnesses.

BERNARD FELDMAN.

Witnesses:
HYMAN FRIEDMAN,
LOUIS Y. LOUIS.

Copies of this patent may be obtained for five cents each, by addressing the "Commissioner of Patents Washington, D. C."